US006772320B1

(12) United States Patent
Raj

(10) Patent No.: US 6,772,320 B1
(45) Date of Patent: Aug. 3, 2004

(54) METHOD AND COMPUTER PROGRAM FOR DATA CONVERSION IN A HETEROGENEOUS COMMUNICATIONS NETWORK

(75) Inventor: Ashok Raj, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 603 days.

(21) Appl. No.: 09/714,647

(22) Filed: Nov. 17, 2000

(51) Int. Cl.[7] .......................... G06F 9/308; G06F 13/40; G06F 12/04; G06F 9/45
(52) U.S. Cl. ...................... 712/225; 712/210; 712/300; 710/66; 711/171; 717/141
(58) Field of Search ................................ 712/223, 224, 712/225, 228, 300, 210, 227; 709/319, 320; 710/105, 315, 74, 30, 305, 66; 711/147, 171, 153; 714/701; 703/27, 23; 717/141

(56) References Cited

U.S. PATENT DOCUMENTS

| | | | |
|---|---|---|---|
| 5,519,842 A | 5/1996 | Atallah et al. | .............. 711/202 |
| 6,081,883 A | * 6/2000 | Popelka et al. | ................ 712/28 |
| 6,138,274 A | * 10/2000 | Huang et al. | .................. 717/11 |
| 6,199,137 B1 | * 3/2001 | Aguilar et al. | .............. 710/305 |
| 6,314,501 B1 | * 11/2001 | Gulick et al. | ............... 711/153 |

\* cited by examiner

Primary Examiner—Daniel H. Pan
(74) Attorney, Agent, or Firm—Christopher K. Gagne

(57) ABSTRACT

A method and computer program for data conversion in a heterogeneous communications network. This method and computer program converts data for computer systems having different data storage architectures so that these computer systems may simply and easily communicate over a network. This is most useful when converting data stored in little endian and big endian format. This method relies on creating the data structure used to convert the data using embedded macros that are not executed at run time. These embedded macros are expanded by the compiler to generate the data structure and thereby saves substantial time during execution.

3 Claims, 5 Drawing Sheets

Data Structure Definition

Compiler expansion of embedded
macros to create data structure

Execution of swap_contents function

METHOD AND COMPUTER PROGRAM FOR DATA CONVERSION IN A HETEROGENEOUS COMMUNICATIONS NETWORK

FIELD

The invention relates to a method and computer program for data conversion in a heterogeneous communications network. More particularly, the present invention converts data for computer systems having different data storage architectures so that these computer systems may simply and easily communicate over a network.

BACKGROUND

In the rapid development of computers many advancements have been seen in the areas of processor speed, throughput, communications, and fault tolerance. Initially computer systems were standalone devices in which a processor, memory and peripheral devices all communicated through a single bus. Later, in order to improve performance, several processors were interconnected to memory and peripherals using one or more buses. In addition, separate computer systems were linked together through different communications mechanisms such as, shared memory, serial and parallel ports, local area networks (LAN) and wide area networks (WAN). However, these mechanisms have proven to be relatively slow and subject to interruptions and failures when a critical communications component fails. Further, in the case where a high speed direct memory access communications method is used, all too often these communications systems are limited in the types of computers that may access and exchange information on the network.

Examples of differing processor and memory architectures may be seen in big endian versus little endian architectures. In a big endian architecture the most significant byte is placed in a lower memory address. This is typically the way humans deal with arithmetic functions and the method employed by a Motorola™ 680x0 system. There is also a little endian architecture in which the least significant byte is placed in a lower memory address. This is done since numbers are calculated by a processor starting with least significant digits and little endian data structures are already set up to facilitate this operation. This type of little endian architecture is employed by the Intel™x86 line of systems. In addition, a bi-endian machine has been developed, such as the PowerPC™, which can handle both types of byte ordering.

However, when a big endian machine and a little endian machine attempt to communicate through memory reads and writes to each other, the data must be re-formatted to be accessible by the other machine. In order to accomplish this programmer's have developed code that swaps bits and bytes of data within words being accessed. However, this development of code by different programmers is time-consuming and prone to error. Further, this code is often specific to each specific application generated. Therefore, one of the purposes of direct memory access for communications is defeated by the lengthy time requirements for this conversion process. Also, time involved in developing and debugging software for each application may be substantial and thus expensive.

Therefore, what is needed is a method and computer program which will create a data structure to enable the conversion from one memory storage format to another. This method and computer program must be generally applicable to all applications programs and all types of data. This method and computer program must also be efficient in the generation of the data structure and the reformatting of the data. Thus, this method and computer program must be easily usable by all applications and programmers and must execute in run-time very quickly so as to facilitate the rapid exchange of information.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
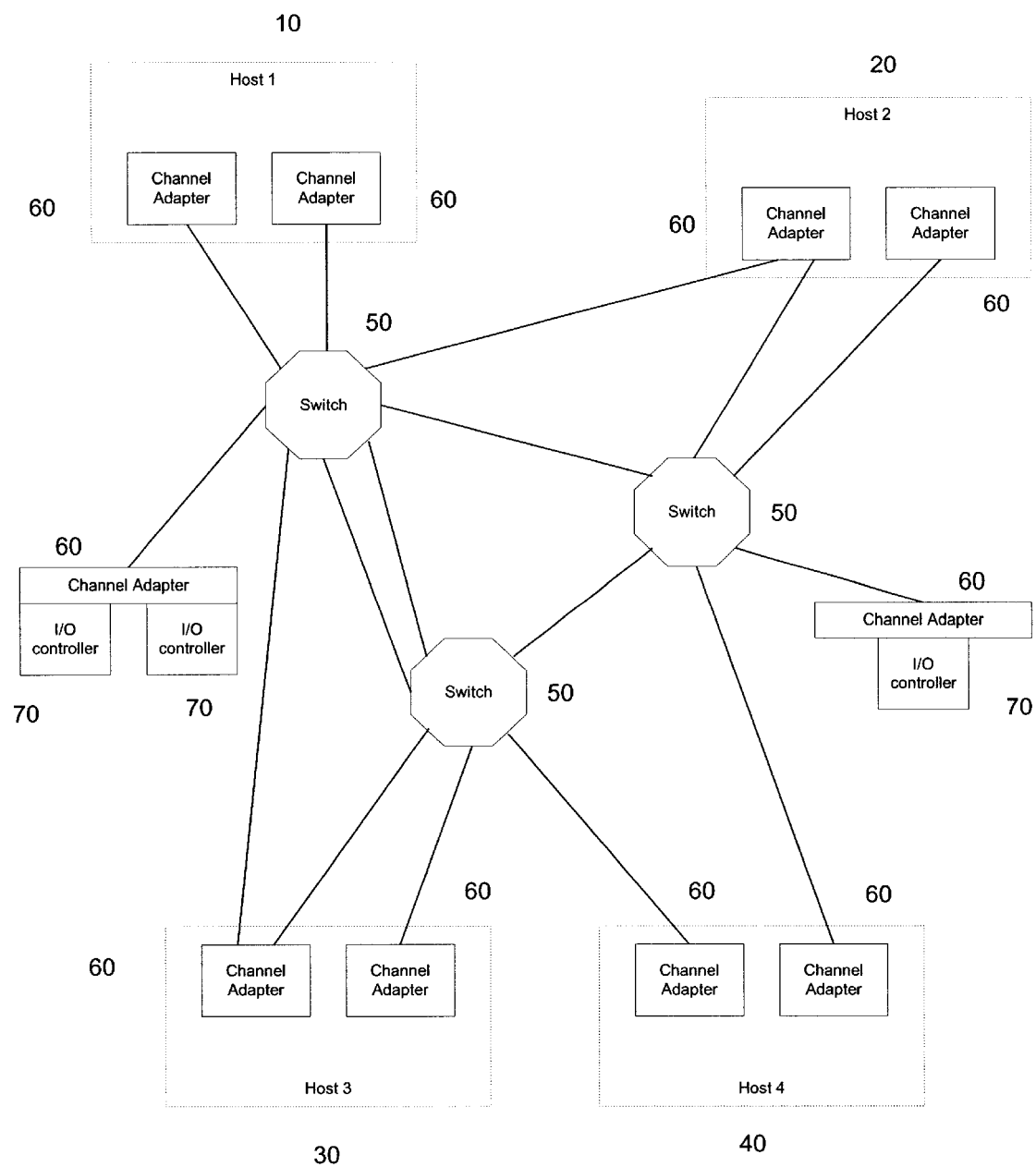
FIG. 1 is an example of an overall InfiniBand systems diagram.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same. As a final note, well-known components of computer networks may not be shown within the FIGS. for simplicity of illustration and discussion, and so as not to obscure the invention.

FIG. 1 is an example of an overall InfiniBand systems diagram which may be used by the embodiments of the present invention. Using such an InfiniBand architecture it may be possible to link together a processor based system 10, through switches 50 to several Input/Output (I/O) controllers 70, and other processor based systems 20, 30 and 40. Each processor based system 10, 20, 30 and 40 may be composed of one or more central processing units (CPU) (not shown), dynamic random access memory (DRAM) (not shown), memory controller (not shown) and a channel adapter 60. A switch 50 may be used to interconnect serial ports to achieve transfer rates of more than one gigabit-per-second.

Referring to FIG. 1, the InfiniBand architecture defines interfaces that move data between two "memory" regions or nodes. Access to an I/O controller 70 and processor based system 10, 20, 30 and 40, may be accomplished by send or receive operations, as well as, remote direct memory access (RDMA) read and RDMA write operations. Cluster or channel adapters provide the control and logic that allows nodes to communicate to each other over the InfiniBand network. A processor based system 10, 20, 30 or 40 may have one or more channel adapters 60 connected to it. Further, an I/O controller 70 may have one or more channel adapters 60 connected to it. Communications in an InfiniBand architecture may be accomplished through these cluster or channel adapters 60 directly or through switches 50.

As can be seen in FIG. 1, the InfiniBand architecture enables redundant communications links between channel adapters 60 and switches 50. Further, it may be possible to create a routing and distance table to identify the shortest paths between nodes in the network. In this case, distance is defined as being the shortest time between two points and not the physical distance. A node or cluster adapter may be a channel adapter 60. Therefore, when data is sent to a memory location in a node it will take the shortest path available and arrive as fast as possible. However, if a failure occurs to a switch 50 then an alternate path may have to be configured and the distance table would have to be computed again.

Figure 2:
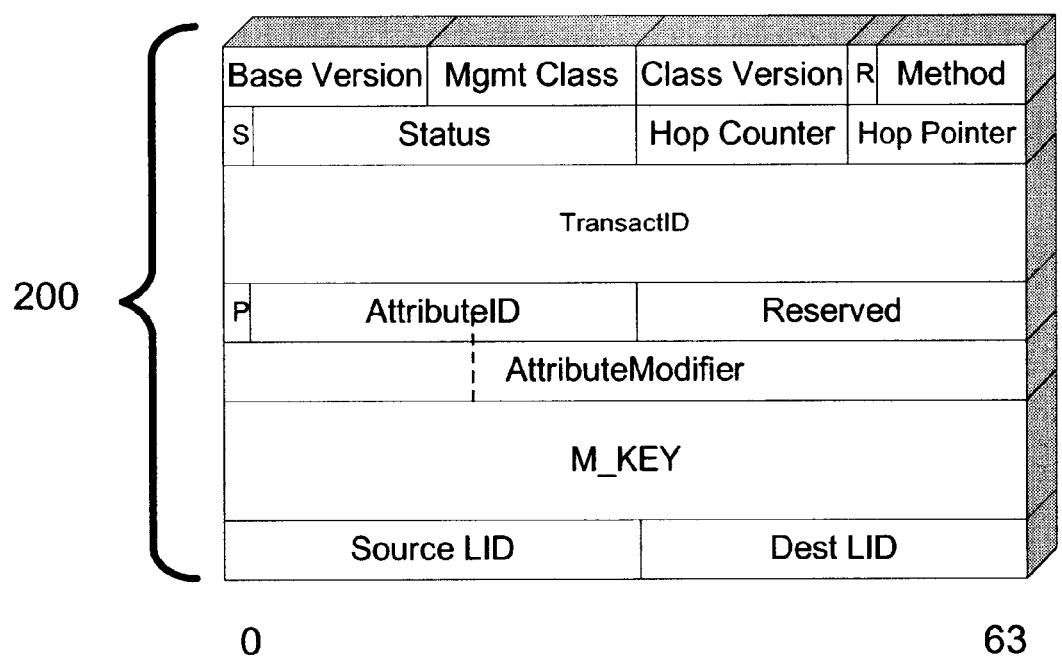
FIG. 2 is an example of a InfiniBand subnet management packet (SMP) header.

FIG. 2 is an example of an InfiniBand subnet management packet (SMP) header 200. Each InfiniBand architecture is divided into subnets having at least one subnet manager (SM). Each SM may reside on a switch 50 and is responsible for configuring the subnet. Communications between the SM and other subnet management agents (SMA) is done through subnet management packet (SMP). Therefore, whenever a computer resides on the subnet it is necessary to be able to reformat data so that it meets the requirements of either big endian or little endian data format. This also applied to the SMP header 200 illustrated in FIG. 2.

The SMP header 200 illustrated in FIG. 2 is composed of several 64-bit fields. The SMP header 200 defines the base version which is a one byte field indicating the version of management datagram based format. A one byte field for management class is provided which represents a subnet management class value. A one byte field for class version is provided which indicates the version field for the management class. A one bit field R is provided to indicate a request/response field.

Further, a 7 bit field is provided for method representing the method of subset management being used. In the second 64-bit field a two byte status field is provided which encodes the status of the method. In addition, a hop pointer is provided to indicate the current byte of the initial/return path field. A hop counter is used to contain the number of valid bytes in the initial/return that indicates how many direct route hops to take. In the third 64-bit field a transaction identification (ID) is provided indicative of a transaction specific identifier. In the fourth 64-bit field a 2 byte attribute identification (ID) is provided indicating the attributes for the SMP. Attributes for SMP's are typically data objects that are composite structures having registers in subnet nodes and these attributes may be read or written. The SMP method uses the attribute ID and attribute modifier to re-define or modify specific registers within a given node. Thereafter, two additional bytes are reserved for future use. In the fifth field an attribute modifier having four bytes is provided for an SMP to use as the index value to further specify data to be obtained or modified. In the sixth field a management key (M_KEY) having eight bytes is provided for SMP authentication. Thereafter, in the seventh field a source local identifier (SLID) and a destination local identifier (DLID) is provided for directed routing.

Figure 3:
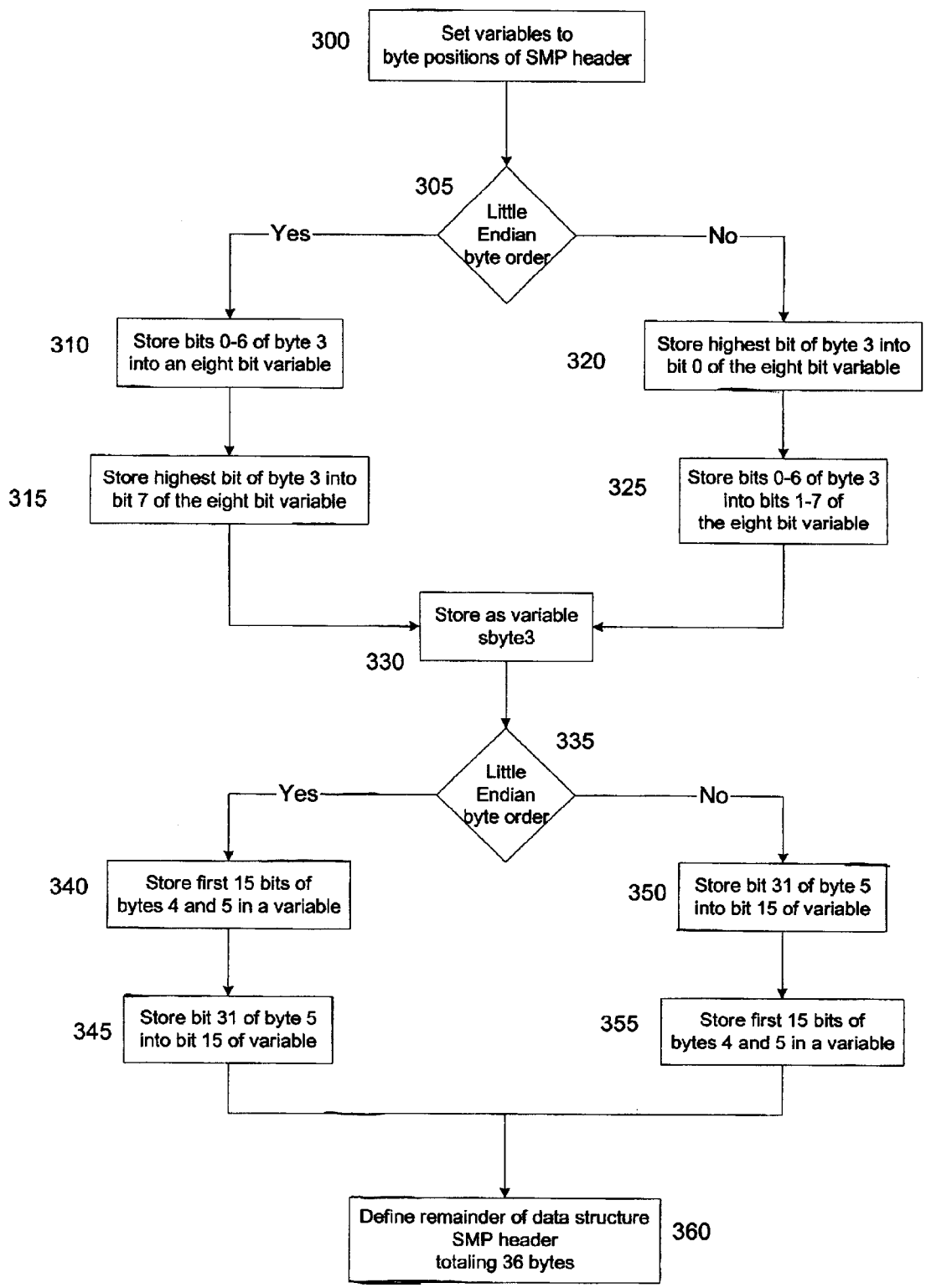
FIG. 3 is a flowchart of the logic used to create an InfiniBand subnet management packet (SMP) header data structure in the example embodiments of the present invention.
Figure 4:
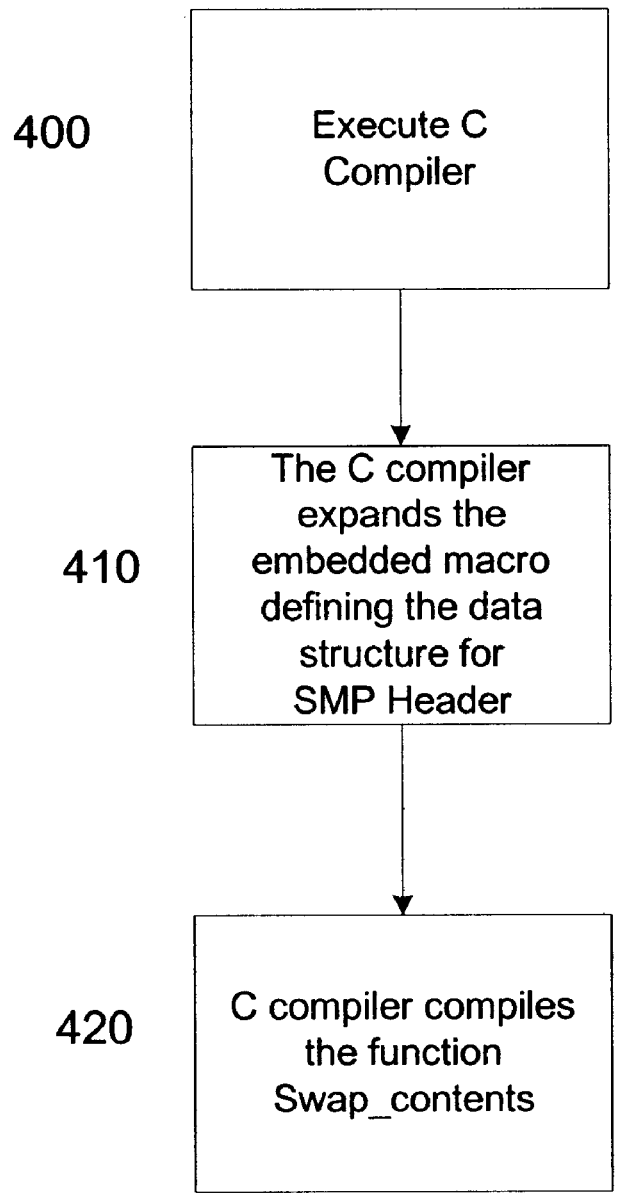
FIG. 4 is a flowchart of a compiler expansion of embedded macros used to create the SMP header data structure in the embodiments of the present invention.
Figure 5:
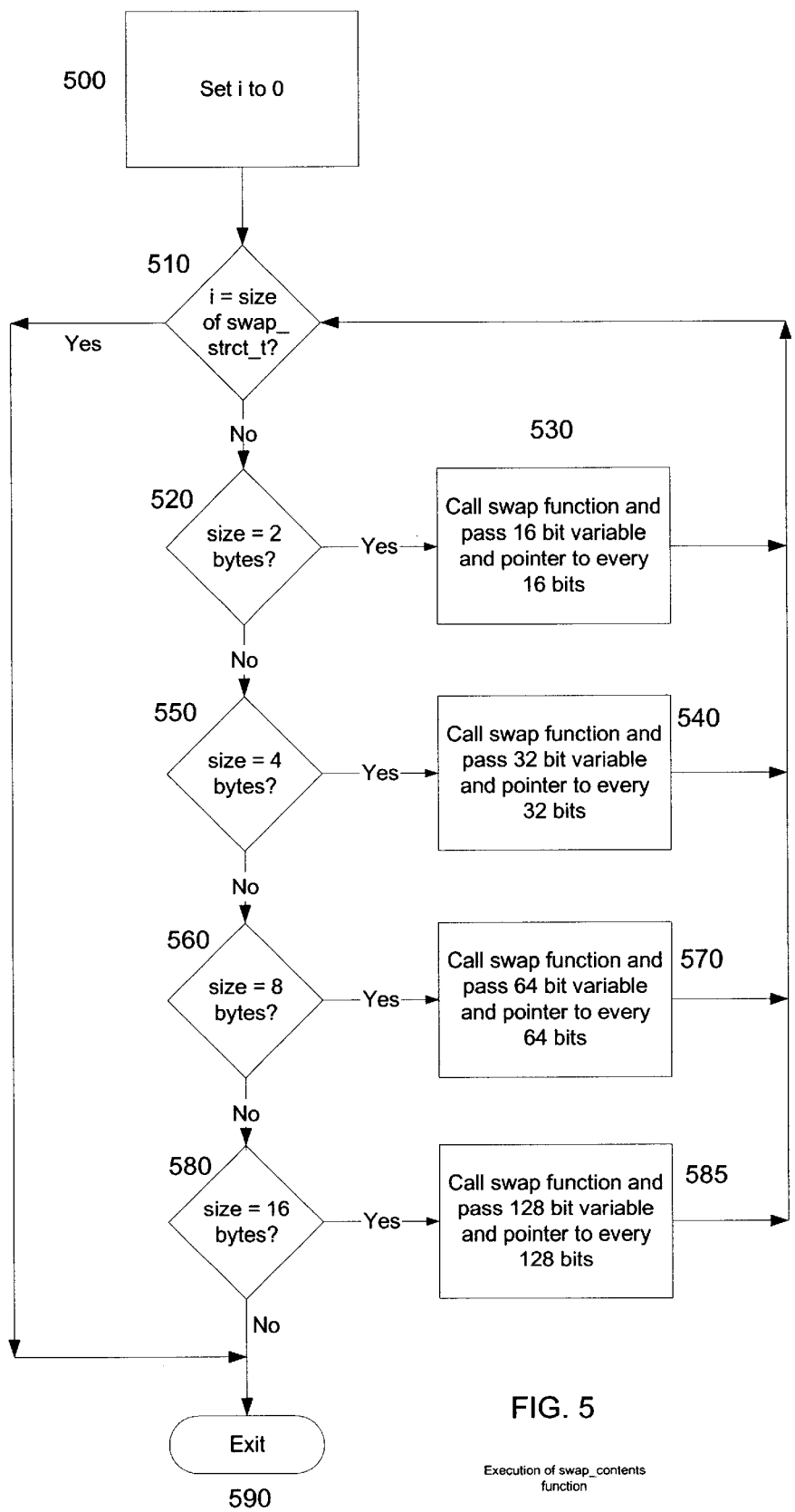
FIG. 5 is a flowchart of the logic involved in converting data used in the example embodiments of the present invention.

FIGS. 3 through 5 are flowcharts representing the logic employed by the example embodiments of the present invention. The blocks illustrated in FIGS. 3 through 5 represent modules, code, code segments, commands, firmware, hardware, instructions and data that are executable by a processor-based system(s) and may be written in a programming language, such as, but not limited to, C++.

FIG. 3 is a flowchart of the logic used to create an InfiniBand subnet management packet (SMP) header 200, shown in FIG. 2, data structure in the example embodiments of the present invention. The logic shown in FIG. 3 may be implemented in the sample C++ program illustrated in Table 1 provided below. It should be noted that the C++ program illustrated in Table 1 is provided by way of example only and as one of ordinary skill in the art would appreciate this program may be implemented using any language and different commands.

TABLE 1

```
typedef struct _SMP_DIR_HDR {
    uint8   base_ver;      // byte 0
    uint8   mgmt_class;    // byte 1
    uint8 class_version;   // byte 2
    struct {   // byte 3
#ifdef LITTLE_ENDIAN
        uint8   method:7;  // bits 0-7 of byte 3
        uint8   req_resp:1; // high bit of byte 3
#else
        uint8   req_resp:1; // high bit of byte 3
        uint8   method:7;  // bits 0-7 of byte 3
#endif
    }sbyte3;
    struct {
#ifdef LITTLE_ENDIAN
        uint16 Status:15;    // byte 4-5 15 bits
        uint16 direction:1;  // bit 31 of byte 5
#else
        uint16 direction:1;  // bit 31 of byte 5
        uint16 Status:15;    // byte 4-5 15 bits
#endif
    }sbyte4;
    uint8   hop_pointer;    // byte 6
    uint8   hop_count;      // byte 7
    uint64 transaction_id;  // bytes 8-15
    uint16 attribute_id;    // bytes 16-17
    uint16 resv1;           // bytes 18-19
    uint32 attribute_mod;   // bytes 20-23
    uint64 m_key;           // bytes 24-31
    uint16 dr_slid;         // bytes 32-33
    uint16 dr_dlid;         // bytes 34-35
} SMP_DIR_HDR;
```

Referring to FIG. 3, execution begins in operation 300 where the variables are set to byte positions of the subnet management packet (SMP) header 200, shown in FIG. 2. Thereafter, processing proceeds operation 305 where it is determined if the little endian byte order is desired. If little endian byte order is desired processing proceeds operation 310 where bits 0 through 6 of byte three are stored in an eight-bit variable. Thereafter, processing proceeds to operation 315 where the highest bit of byte three is stored into bit 7 of the eight-bit variable. However, if in operation 305 it is determined that little endian byte order is not desired, then processing proceeds to operation 320 where the highest bit of byte three is stored into bit zero of the eight-bit variable. Processing then proceeds to operation 325 where bits 0 through 6 of byte 3 are stored into bits 1 through 7 of the eight-bit variable.

Regardless of whether the little endian byte order is selected in operation 305 processing proceeds to operation 330 where the eight-bit variable determined in operation 310 through 325 is stored as sbyte3. Thereafter, processing proceeds to operation 335 where again it is determined if little endian byte order is desired. If little endian byte order is desired then processing proceeds to operation 340 where the first 15 bits of bytes 4 and 5 are stored in a variable. Thereafter in operation 345 bit 31 of byte 5 is stored into bit 15 of the variable. However, if in operation 335 it is determined that little endian byte order is not desired then processing proceeds to operation 350. In operation 350, bit 31 of byte 5 is stored into bit 15 of a variable. In operation 355 the first 15 bits of bytes 4 and 5 are stored in the variable.

Regardless of whether little endian byte order is desired in operation 335, in operation 360, the remaining portion of the SMP header 200 data structure is defined.

FIG. 4 is a flowchart of a compiler expansion of embedded macros used to create the SMP header 200 data structure in the embodiments of the present invention. The processes shown in FIG. 4 compile the embedded macros and code contained in Table II as discussed in further detail below. The operations shown in FIG. 4 begin in operation 400 by executing a standard C++ compiler. Thereafter, in operation 410, the C++ compiler expands embedded macros shown in Table II which define the data structure for the SMP header 200 shown in Table I. These embedded macros takes the place of the logic shown and discussed in reference to FIG. 3. The embedded macros create the SMP header 200 data structure as shown and discussed in FIG. 3. The advantage of using the embedded macros shown in Table II and compiled in operation 410 is that the data structure is generated during compilation rather than during execution. The savings in terms of processor power is enormous when the data structure can be generated during compilation time which is in constant usage by application programs. Further, once tested these embedded macros may be incorporated in every application program that utilizes the SMP header 200. Thereafter, in operation 420, the C++ compiler compiles the function swap contents shown in Table III.

TABLE II

```
#define field_offset(struct_name field)   \
    ((uint16) ((char *)& ((struct_name *) 0)->field))
#define DEFINE_STRUCT_START(name)   \
    swap_struct_t swap_##name[] = {
#define DEFINE_STRUCT_FIELD(struct_name, field)\
{   \
    sizeof(((struct_name *) 0)->field), \
    field_offset(struct_name, field)   \
},
#define DEFINE_STRUCT_END (struct_name)   {0,0}};
#define SWAP_STRUCT_NAME(struct_name) swap_##name
// Now the definition that describes this structure
// the same definition and function are used both while sending
// and receiving a stucture that needs transformation.
DEFINE_STRUCT_START (SMP_DIR_HDR)
    DEFINE_STRUCT_FIELD(SMP_DIR_HDR, sbyte4)
    DEFINE_STRUCT_FIELD(SMP_DIR_HDR, transaction_id)
    DEFINE_STRUCT_FIELD(SMP_DIR_HDR, attribute_id)
    DEFINE_STRUCT_FIELD(SMP_DIR_HDR, attribute_mod)
    DEFINE_STRUCT_FIELD(SMP_DIR_HDR m_key)
    DEFINE_STRUCT_FIELD(SMP_DIR_HDR dr_slid)
    DEFINE_STRUCT_FIELD(SMP_DIR_HDR dr_dlid)
DEFINE_STRUCT_END
```

Table III is an example of the expansion of the embedded macros illustrated in Table II and executed in operation 410. This expansion is only for the data structure referred to as "define_struct_start" and is only provided by way of example. As would be appreciated by one of ordinary skill in the art, the expansion of the macros performed by the compiler is three levels deep and further expansion in Table III is not required. It should be again noted that the expansion of the data structure is accomplished by the C++ compiler rather than during program execution as illustrated in FIG. 3.

TABLE III

```
// Expanded form after pre-compilation.
    swap_struct_t swap_SMP_DIR_HDR[] = // Defined by
    DEFINE_STRUCT_START
    {
        {2, 4},  // sbyte4: size 2, offset 4
        {8, 8},  // transaction id: size 8, offset 8
        {2, 16}, // attribute_id: size 2, offset 16
        {4, 20}, // attribute mod: size 4, offset 20
        {8, 24}, // m_key: size 8, offset 24
        {2, 32}, // slid: size 2, offset 32
        {2, 34}, // dlid: size 2, offset 34
        {0, 0}   // placed by DEFINE_STRUCT_END
    };
```

FIG. 5 is a flowchart of the logic involved in converting data used in the example embodiments of the present invention as performed by the swap_contents function module. The swap_contents function module begins execution in operation 500 where a variable i is set to zero. In operation 510, it is determined whether i is equal to the size of the swap structure variable to be converted. If the value of i=the size of the swap structure variable, then processing proceeds to operation 590 where processing terminates. However, if the value of i is not equal of the size of the swap structure variable, then processing proceeds to operation 520. In operation 520, it is determined if the size of the swap structure variable is equal to two bytes. If the swap structure variable has a size equal to two bytes, then processing proceeds to operation 530. In operation 530, the swap function is called and passed a 16-bit variable and pointer to every 16 bits. Thereafter, processing loops back to operation 510 from operation 530.

However, in operation 520 if the size of the swap structure variable is not two bytes then processing proceeds to operation 550. In operation 550, it is determined whether the swap structure variable has a size equal to 4 bytes. If the swap structure variable has a size equal to 4 bytes then processing proceeds to operation 540. In operation 540, the swap function is called and passed a 32-bit variable and a pointer to every 32 bits. Thereafter, processing loops back from operation 540 to operation 510.

However, in operation 550 if the size of the swap variable is not equal to four bytes in length then processing proceeds to operation 560. In operation 560 it is determined if the size of the swap structure variable is equal to 8 bytes in length. If the size of the swap structure variable is equal to 8 bytes in length, then processing proceeds to operation 570. In operation 570, the swap function is called and passed a 64-bit variable and a pointer to every 64 bits. Thereafter, processing loops back to operation 510 from operation 570.

However, if in operation 560 it is determined that the swap structure variable is not equal 8 bytes in size, then processing proceeds to operation 580. In operation 580 it is determined whether the size swap structure variable is equal to 16 bytes in length. If the swap structure variable is equal to 16 bytes in length then processing proceeds to operation 585. In operation 585, the swap function is called and passed a 128 it variable with a pointer to every 128 its. Thereafter, processing loops back to operation 510 from operation 585. However, if the swap structure variable does not have a size of 16 bytes, then processing proceeds to operation 590 and processing terminates.

The benefit resulting from the present invention is that a simple, reliable, fast method and computer program is provided that will convert from little endian data format to big endian data format and back again. The data structure required to accomplish this is generated using embedded macros during compilation. Therefore, no runtime processing power is wasted creating the data structure for each application. This allows for extremely fast execution of the conversion.

While we have shown and described only a few examples herein, it is understood that numerous changes and modifications as known to those skilled in the art could be made to the example embodiment of the present invention. Therefore, we do not wish to be limited to the details shown and described herein, but intend to cover all such changes and modifications as are encompassed by the scope of the appended claims.

I claim:

1. A method of converting format of a data structure, comprising:

determining when little endian byte order or big endian byte order is desired;

storing bits 0–6 of byte 3 of the data structure into an eight bit variable when the little endian byte order is desired;

storing the highest bit of the data structure into bit 7 of the eight bit variable when the little endian byte order is desired;

storing the first 15 bits of the data structure into bytes 4 and 5 of a second variable when the little endian byte order is desired; and storing bit 31 of byte 5 of the data structure into bit 15 of the second variable when the little endian byte order is desired.

2. The method recited in claim 1, further comprising storing the highest bit of said byte 3 of the data structure into bit 0 of the eight bit variable when big endian byte order is desired;

storing said bits 0–6 of said byte 3 of the data structure into bits 1–7 of the eight bit variable when the big endian byte order is desired;

storing said bit 31 of said byte 5 of the data structure into said bit 15 of a second variable when the big endian byte order is desired; and storing the first 15 bits of byte 4 and said byte 5 of the data structure into the second variable when the big endian byte order is desired.

3. The method recited in claim 2, wherein the data structure comprises a packet header.

* * * * *

UNITED STATES PATENT AND TRADEMARK OFFICE
CERTIFICATE OF CORRECTION

PATENT NO. : 6,772,320 B1  Page 1 of 1
DATED : August 3, 2004
INVENTOR(S) : Raj

It is certified that error appears in the above-identified patent and that said Letters Patent is hereby corrected as shown below:

Column 6,
Line 63, delete "it" and insert -- bit --.
Line 63, delete "its" and insert -- bits --.

Signed and Sealed this

Thirtieth Day of November, 2004

JON W. DUDAS
*Director of the United States Patent and Trademark Office*